Sept. 20, 1932.   P. W. THOMPSON   1,878,731
METHOD OF AND MEANS FOR SEALING THE SHAFT PACKINGS OF TURBINES
Filed Aug. 28, 1930   2 Sheets-Sheet 1

INVENTOR.
PAUL W. THOMPSON,
BY Shepherd Campbell.
ATTORNEYS

INVENTOR.
PAUL W. THOMPSON,
BY
Shepherd Campbell
ATTORNEYS

Patented Sept. 20, 1932

1,878,731

UNITED STATES PATENT OFFICE

PAUL WHEELER THOMPSON, OF DETROIT, MICHIGAN

METHOD OF AND MEANS FOR SEALING THE SHAFT PACKINGS OF TURBINES

Application filed August 28, 1930. Serial No. 478,441.

This invention relates to a method of and means for sealing the shaft packings of turbines. In any steam turbine having a shaft extending through the high pressure casing, there is a tendency for the steam to leak out of the turbine through the annular space between the shaft and the turbine casing. In the case of turbines using superheated steam of ordinary temperatures, that is, around 700 to 750° F., the temperature of the shaft does not become great enough to permit the conduction of heat to the bearing in such quantities as to become dangerous, or to result in unsatisfactory operation. Under these conditions, a saw tooth packing of sufficient length is used to reduce the quantity of the steam leakage by making a tortuous path, and the temperature of the rotor and shaft is reduced by the radiation of heat to the room and to other parts of the turbine. To be sure, some heat is conducted along the shaft and into the bearing journal, where the temperature is held below the danger point by the circulation of cooled oil. Cooled oil is, of course, usually used on all bearings, and is ordinary turbine practice. At high steam temperatures, however, the radiation of heat away from the shaft would not be at a sufficiently high rate to hold the bearing journal temperatures down to a safe limit even with cooled oil in large quantities. So my invention is designed to protect that portion of the shaft from attaining a high temperature.

Figure 1:
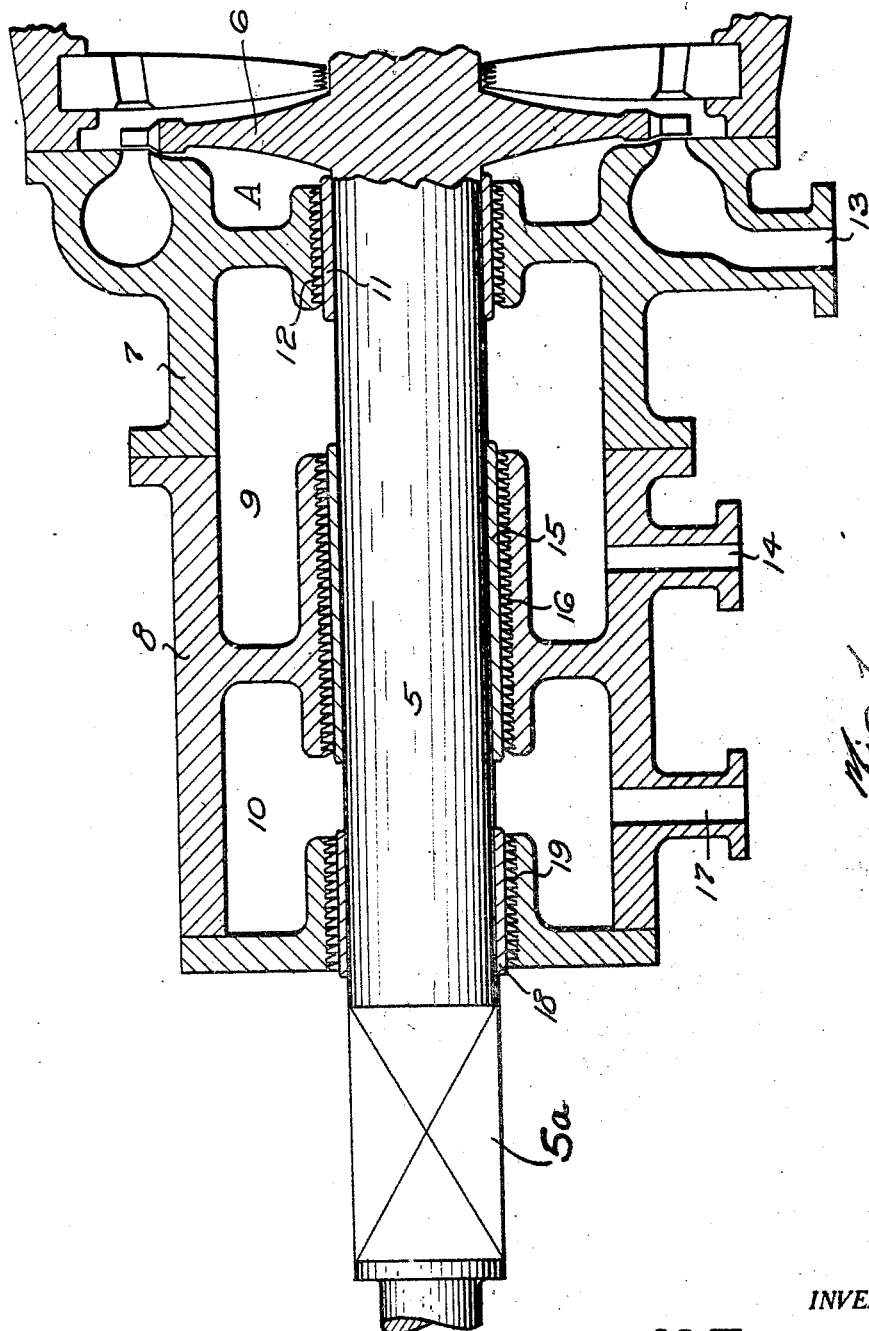
Figure 2:
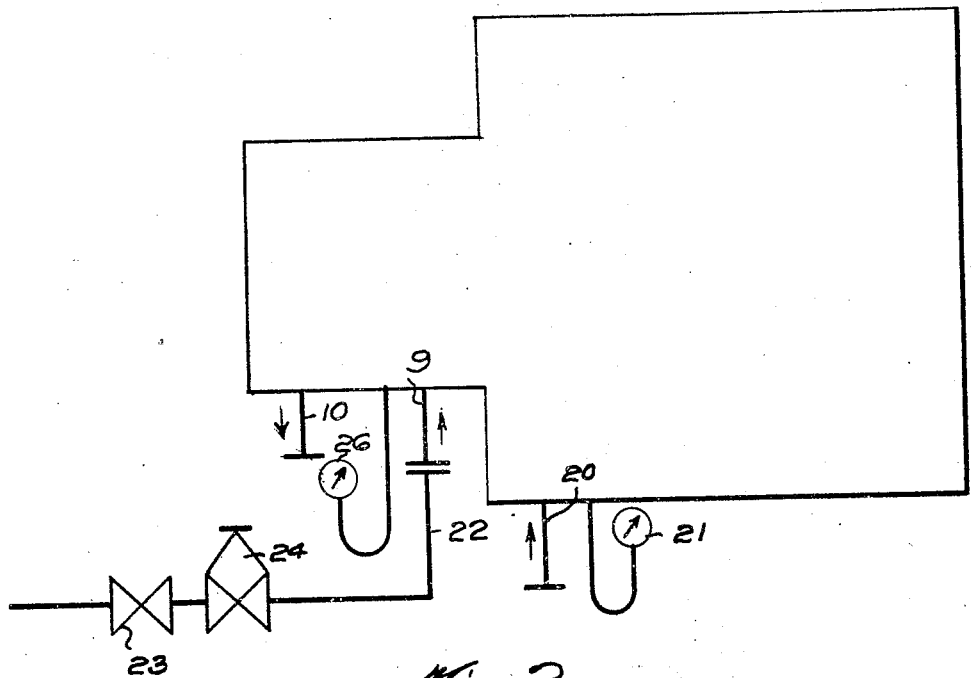
Figure 3:
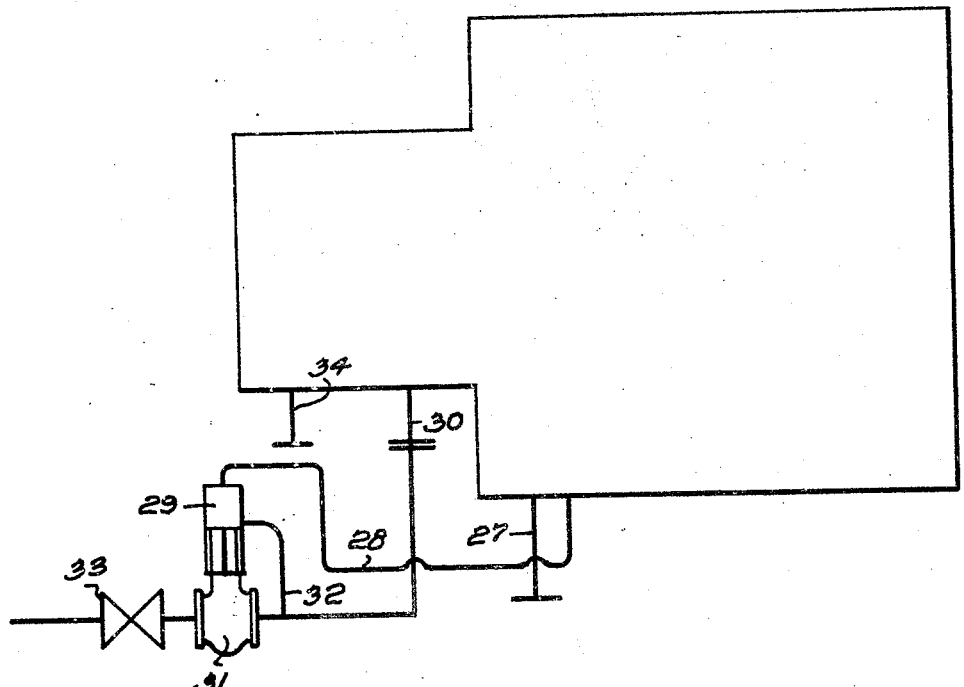

The Figure 1, shown in the accompanying drawings is a sectional view through the bearing, shaft, first stage wheel and a portion of the turbine casing, Figs. 2 and 3 are diagrammatic views.

In these drawings, 5 designates the shaft (having bearing portions 5a), 6 the first stage wheel, and 7 a portion of the turbine casing which is lengthened by extension 8, or in any other desired manner, to provide chambers 9 and 10. A metal ring 11 is fitted tightly on the shaft, immediately outside of the first stage wheel 6, and a portion of the turbine casing, or shaft packing casing, is brought down and around this ring, terminating in a saw toothed packing face 12. In operation, superheated steam is admitted to the turbine, at 13, in the usual way, and a portion of this steam would leak out through the space between the ring 11 and the saw tooth 12 unless prevented. I prevent this leakage by introducing into the chamber 9 a medium of greater pressure but lower temperature than the superheated steam that is acting upon the turbine blades. For convenience of explanation, I will describe an arrangement wherein the sealing medium consists of saturated steam. In any plant using superheated steam, the saturated steam is at a pressure higher than the superheated steam by an amount equal to the pressure drop (resulting from friction) in the superheater. Consequently, saturated steam is always available at a pressure higher than the superheated steam. Therefore, by introducing steam, which may be saturated, through an inlet 14, I am able to maintain, outwardly of the first stage wheel of the turbine, a body of sealing fluid at a pressure sufficiently high to resist the escape of the superheated steam from the interior of the turbine and at a temperature low enough to protect the shaft and bearing against undue overheating. A second ring 15 surrounds the shaft between the chambers 9 and 10, and a portion of the casing 8 is extended inwardly and provided with an elongated saw tooth packing face 16 disposed around said ring to resist the escape of the saturated steam from the chamber 9. Such of the saturated steam as does escape from the chamber 9 into chamber 10 may be led off through a conduit 17 to any desired point, such, for example, as to a low stage of the turbine, to a heat reclaiming device, or any other point. It is common practice, in ordinary turbines, to conduct the leakage of superheated steam from a high pressure stage of the turbine to a lower stage of the turbine, or to a heat reclaiming device. A third ring 18 surrounds the shaft outwardly of the chamber 10, and the end wall of the casing 8 is extended inwardly and provided with a saw tooth shaped packing face, 19, which extends about said ring and prevents escape of any of the steam endwise of the shaft.

The point in which my invention differs from the usual and known practice, is in the provision of the intermedite chamber 9 between the interior of the turbine and the chamber 10, and the maintenance in this intermediate chamber of a sealing medium of a higher pressure and a lower temperature than the medium that is being used to drive the turbine. The conditions existing in turbine practice are very different from those existing in the case of reciprocating engines. The pressure inside a turbine casing tending to force steam to leak through the packing is a constant quantity for any one load on the packing, whereas in the reciprocating engine the pressure in the cylinder varies continuously throughout the different positions of the piston even at constant load on the engine. Further, in the case of the reciprocating engine we do not have to take care of the maintenance of a sufficiently low temperature for the shaft bearing of a shaft rotating at a very high rate of speed. In the case of the reciprocating engine the packing actually grasps the piston rod under considerable pressure while in the case of the saw tooth packing, herein shown and described, there is no real contact between the saw teeth and the rotating shaft carried parts, the provision of the tortuous path being relied upon to prevent undue escape of steam rather than any gripping action of packing about the shaft. While the provision of means for preventing undue escape of steam is one of the important features of my invention, the prevention of the passage of an undue amount of heat to the shaft bearing is a more important feature of the invention. Another feature of advantage inherent in the present construction lies in the fact that there is an actual reduction in heat losses by virtue of the fact that the leak off steam is saturated instead of superheated, because, assuming the quantity actually leaking out to be the same with or without my device, the superheated steam contains more heat units than the saturated steam. Therefore, there is a gain in economy by limiting the loss of heat units. Any desired pressure difference between the interior of the chamber 9 and the interior of the turbine may be maintained by the provision of valves, of conventional form. For example, constant differential pressure valves are well known and their use will be obvious in this relation, to the engineer. However, for purposes of explanation, I have illustrated in Fig. 2 hand controlled means for maintaining constant pressure differential between the high pressure sealing chamber and the first turbine stage while, in Fig. 3, I have illustrated automatic regulating means for maintaining constant pressure differential between the high pressure sealing chamber 9 and the first turbine stage or chamber A, of the turbine.

In Fig. 2, 20 designates the main steam supply line to the turbine, and 21 indicates a guage which is connected to the first turbine stage chamber of the turbine. The sealing steam supply line 22 is indicated as leading to the sealing chamber 9, and this line is provided with a conventional shut-off valve 23, and a hand operated valve 24, through the manipulation of which a desired pressure may be maintained in chamber 9. A gauge 25 renders it possible for the operator to determine the degree of pressure that is being maintained in chamber 9, while the gauge 21 indicates to the operator the degree of pressure that is being maintained in the first turbine stage chamber. The leak off steam connection is indicated at 26.

In Fig. 3, the main steam supply line to the first stage of the turbine is indicated at 27, and a branch 28 leads from this line to a conventional type of pressure differential valve 29. The steam supply line to the sealing chamber 9 is indicated at 30, and the pressure differential valve 31 is located in said line and controls the pressure therethrough. A connection 32 leads from the line 30 to the pressure differential valve casing 29, the valve 31 functioning to maintain, in a usual and known way, a constant difference between the pressures in the lines 28 and 32.

A shut-off valve is located at 33. Gauges may be employed in this construction, if desired, though they are not essential. Leak-off steam connection is located at 34, in this figure.

While I have described the invention in its application to a steam turbine, it is clear that it is applicable to both steam and gas turbines, and while I have described the use of superheated and saturated steam as the pressure differential medium, it is to be understood that the invention includes the use of any fluids, including liquids, vapors, or gases, through the medium of which a body is maintained at a higher pressure and a lower temperature, outwardly of the packing of the turbine, for the purpose of preventing the escape of the turbine driving medium, while protecting the shaft and the parts carried by, or associated therewith, including the shaft bearings, from excessive heat.

Having described my invention, what I claim is:

1. The herein described method of sealing a turbine shaft packing and protecting the shaft bearing from heat which consists of maintaining a body of fluid about a rapidly rotating turbine shaft at a point outwardly of said packing and between the working chamber of the turbine and said shaft bearing, said fluid being at a higher pressure and a lower temperature than the motive fluid of the turbine.

2. The herein described method of sealing a turbine shaft packing against leakage and protecting the turbine shaft bearing against the transmission of heat from the turbine which consists of maintaining a body of saturated steam outwardly of and in contact with said packing and between the working chamber of the turbine and said shaft bearing which steam is of a higher pressure and lower temperature than a superheated steam constituting the motive fluid of the turbine.

3. The herein described method of sealing a non-pressure type turbine shaft packing of a high speed steam turbine employing steam at temperatures in excess of 750 degrees which consists of maintaining a body of saturated steam outwardly of and in contact with said packing and between the working chamber of the turbine and said shaft bearing, which steam is of a higher pressure and a lower temperature than the superheated steam constituting the motive fluid of the turbine to thereby prevent leakage of steam past said packing and prevent the transmission of excessive heat from said high temperature steam to the said turbine shaft bearing.

4. The herein described method of sealing a non-pressure type turbine shaft packing against leakage and protecting the turbine shaft bearing against the transmission of heat from the working chamber of the turbine, which consists of maintaining a body of sealing fluid outwardly of and in contact with said packing and between the working chamber of the turbine and said shaft bearing which fluid is of a higher pressure and lower temperature than the motive fluid of the turbine and where the temperature of the latter is in excess of 750 degrees.

5. The combination with a turbine employing motive steam at temperatures in excess of 750 degrees and comprising a high speed rotative shaft, a first stage turbine wheel upon said shaft, a casing in which said turbine wheel is disposed, means for introducing high pressure superheated steam into said casing, an extension casing surrounding said shaft outwardly of the first stage turbine wheel and having a pressure chamber therein, a bearing portion upon the shaft outside of said casing, a non-pressure type packing between said bearing portion and said pressure chamber, said bearing portion serving to hold the elements of said packing in non-contacting relation, and a conduit leading to said pressure chamber from a source of saturated steam that is at lower temperature and higher pressure than the superheated steam of the turbine to thereby deliver such saturated steam to said pressure chamber for the double purpose of preventing leakage of steam from the working chamber of the turbine and of preventing the transmission of the high temperature of the working steam to said shaft bearing.

6. A structure as recited in claim 5 in combination with a second packing of the non-pressure type between the said pressure chamber and the first stage turbine wheel.

7. A structure as recited in claim 5 in combination with a second chamber disposed outwardly of the first named chamber, a non-pressure type packing surrounding the shaft at the outer end of the second chamber, and means for conducting steam of leakage from said last named chamber.

In testimony whereof I affix my signature.

PAUL WHEELER THOMPSON.